US012691992B2

(12) United States Patent
Gieseking

(10) Patent No.: US 12,691,992 B2
(45) Date of Patent: Jul. 28, 2026

(54) ACCESS CONTROL DEVICE, ACCESS CONTROL SYSTEM, DOOR PORTION HAVING AN ACCESS CONTROL DEVICE, AND METHOD FOR OPENING A DOOR

(71) Applicant: LUFTHANSA TECHNIK AG, Hamburg (DE)

(72) Inventor: Florin Gieseking, Lucerne (CH)

(73) Assignee: LUFTHANSA TECHNIK AG, Hamburg (DE)

( * ) Notice: Subject to any disclaimer, the term of this patent is extended or adjusted under 35 U.S.C. 154(b) by 42 days.

(21) Appl. No.: 18/838,255

(22) PCT Filed: Feb. 13, 2023

(86) PCT No.: PCT/EP2023/053473
§ 371 (c)(1),
(2) Date: Aug. 14, 2024

(87) PCT Pub. No.: WO2023/156333
PCT Pub. Date: Aug. 24, 2023

(65) Prior Publication Data
US 2025/0145270 A1 May 8, 2025

(30) Foreign Application Priority Data

Feb. 17, 2022 (DE) ..................... 10 2022 103 754.1

(51) Int. Cl.
*B64C 1/14* (2006.01)
*E05B 81/08* (2014.01)
(Continued)

(52) U.S. Cl.
CPC ............ *B64C 1/1407* (2013.01); *E05B 81/08* (2013.01); *E05B 81/16* (2013.01); *E05B 81/28* (2013.01);
(Continued)

(58) Field of Classification Search
CPC ....... B64C 1/1407; E05B 81/08; E05B 81/16; E05B 81/28; E05B 81/50; E05B 81/56; E05B 81/88; E05B 83/36
(Continued)

(56) References Cited

U.S. PATENT DOCUMENTS

| | | | | |
|---|---|---|---|---|
| 3,919,869 | A | * | 11/1975 | Fromm .............. G07C 9/00904 70/264 |
| 2003/0006879 | A1 | * | 1/2003 | Kang ................... G08B 13/189 340/5.61 |

(Continued)

FOREIGN PATENT DOCUMENTS

| | | | |
|---|---|---|---|
| DE | 102007010583 | A1 | 9/2008 |
| DE | 102012004000 | A1 | 8/2013 |

(Continued)

*Primary Examiner* — Nathan Cumar
(74) *Attorney, Agent, or Firm* — LEYDIG, VOIT & MAYER, LTD.

(57) ABSTRACT

An access control device is for a door of a vehicle. The access control device has: an actuation element with an actuator, the actuation element being controllably configured to be brought from a blocking state into a release state and vice-versa; a power supply interface, which is configured to supply the access control device with power; a controller, which is configured to carry out open-loop and/or closed-loop control of a state of the actuation element; and a near-field communication interface, which is configured to read out a digital access authorisation and to transmit the digital access authorisation to the controller. The controller is configured to carry out the open-loop and/or closed-loop control of the state of the actuation element in accordance with a validity of the digital access authorisation. The power supply interface is configured such that a portable energy store is connectable without the use of tools.

17 Claims, 5 Drawing Sheets

(51) Int. Cl.
 *E05B 81/88* (2014.01)
 *E05B 83/36* (2014.01)
(52) U.S. Cl.
 CPC .............. *E05B 81/50* (2013.01); *E05B 81/56* (2013.01); *E05B 81/88* (2013.01); *E05B 83/36* (2013.01)
(58) Field of Classification Search
 USPC ........................................................ 70/263
 See application file for complete search history.

(56) References Cited

U.S. PATENT DOCUMENTS

| | | | | | |
|---|---|---|---|---|---|
| 2009/0183541 | A1* | 7/2009 | Sadighi | .................... | G07C 9/27 70/320 |
| 2011/0273269 | A1* | 11/2011 | Pujol | ................. | G07C 9/00896 340/12.5 |

| | | | | | |
|---|---|---|---|---|---|
| 2014/0316612 | A1* | 10/2014 | Banter | .................... | B60R 25/01 701/2 |
| 2016/0371907 | A1* | 12/2016 | Ma | ........................ | G06F 3/0227 |
| 2018/0105036 | A1* | 4/2018 | Guardianelli | .......... | E05B 81/16 |
| 2020/0300006 | A1* | 9/2020 | Bendel | .................... | E05B 81/16 |
| 2021/0025203 | A1* | 1/2021 | Bendel | .................... | E05B 81/80 |
| 2021/0183228 | A1* | 6/2021 | Yun | ........................ | G07C 5/008 |
| 2021/0409335 | A1* | 12/2021 | Zhu | ........................ | H04L 47/24 |
| 2022/0025678 | A1* | 1/2022 | Okawa | .................... | E05B 81/06 |
| 2022/0266794 | A1* | 8/2022 | Wagener | ............ | B60R 25/1018 |

FOREIGN PATENT DOCUMENTS

| | | |
|---|---|---|
| DE | 102017125719 A1 | 5/2019 |
| DE | 102018124331 A1 | 4/2020 |
| DE | 102019209240 A1 | 12/2020 |
| EP | 3654298 A1 | 5/2020 |

* cited by examiner

A-A

ACCESS CONTROL DEVICE, ACCESS CONTROL SYSTEM, DOOR PORTION HAVING AN ACCESS CONTROL DEVICE, AND METHOD FOR OPENING A DOOR

CROSS REFERENCE TO RELATED APPLICATIONS

This application is a U.S. National Phase application under 35 U.S.C. § 371 of International Application No. PCT/EP2023/053473, filed on Feb. 13, 2023, and claims benefit to German Patent Application No. DE 10 2022 103 754.1, filed on Feb. 17, 2022. The International Application was published in German on Aug. 24, 2023 as WO 2023/156333 A1 under PCT Article 21(2).

FIELD

The present disclosure relates to an access control device.

BACKGROUND

In order to protect restricted areas from unauthorised access, doors or flaps designed to physically prevent access are usually equipped with an access control system. Such an access control system can, for example, can be formed by a locking mechanism that can be operated by a conventional, physical key.

To simplify the administration of access authorisations, an electronic access control systems may be used, in which, for example, an access authorisation card stores a digital key which can then be read by means of a reader of an access control device. If the digital key authorises access, for example a door is unlocked so that it can be opened.

Such an electronic access system is disclosed, for example, from US 2003/0006879 A1. There a door control system is disclosed that allows a door to be opened and closed using a wirelessly readable access authorisation card. The disadvantage of this solution, however, is that the access authorisation card alone is sufficient to give a user access to an access-controlled area. Therefore, there is a security risk if the access authorisation card is lost.

Especially in the aviation sector, access restrictions play a central role in safety. Especially in the area of VIP aircraft, there is a need to protect the aircraft from unauthorised access. Securing the cabin and cargo holds of such aircraft is of crucial importance for owners of such machines, for example when such a VIP aircraft is parked on the apron overnight.

A centrally controllable system for monitoring and locking aircraft doors is therefore known from US 2011/0273269 A1. The disadvantage of this solution, however, is that it has to be integrated into the system architecture of the aircraft, so that retrofitting aircraft with this solution is only possible with considerable effort.

SUMMARY

In an embodiment, the present disclosure provides an access control device that is for a door of a vehicle. The access control device has: an actuation element with an actuator, the actuation element being controllably configured to be brought from a blocking state into a release state and vice-versa; a power supply interface, which is configured to supply the access control device with power; a controller, which is configured to carry out open-loop and/or closed-loop control of a state of the actuation element; and a near-field communication interface, which is configured to read out a digital access authorisation and to transmit the digital access authorisation to the controller. The controller is configured to carry out the open-loop and/or closed-loop control of the state of the actuation element in accordance with a validity of the digital access authorisation. The power supply interface is configured such that a portable energy store is connectable without the use of tools.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
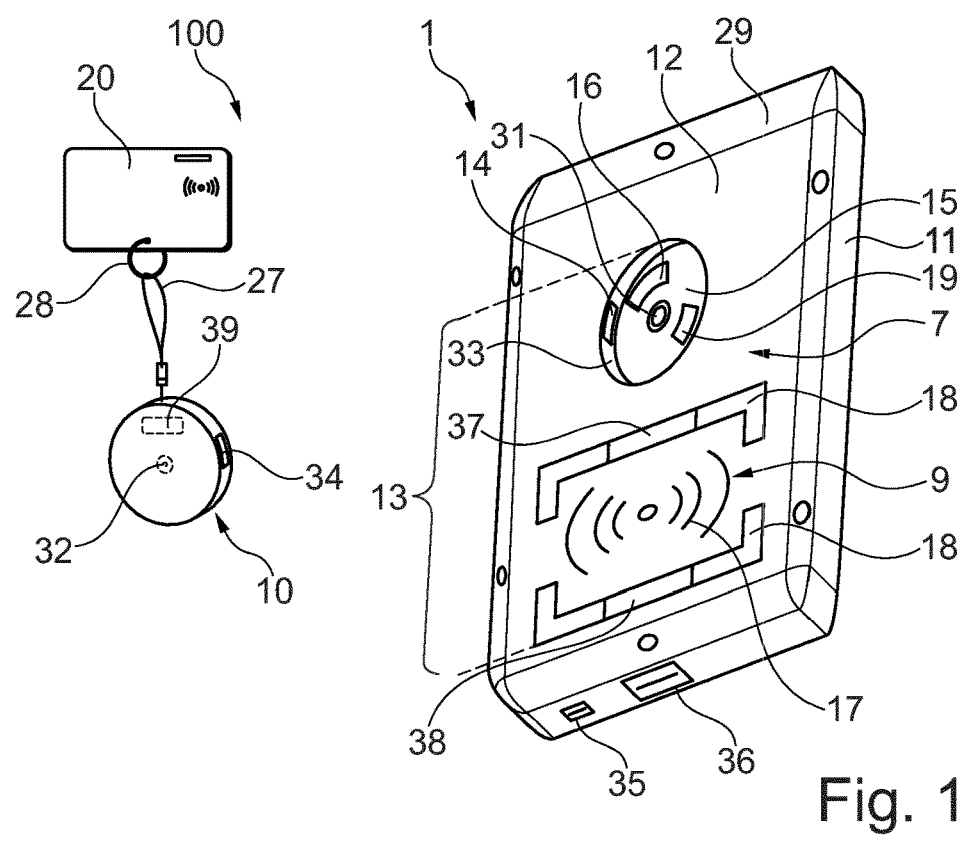
FIG. 1 shows an access control system.

Aspects of the present disclosure provide an improved access control device for doors of a vehicle, in particular an aircraft, as well as a corresponding access control system, a corresponding door portion, and a corresponding method.

According to a first aspect of the present disclosure, an access control device for a door of a vehicle, in particular an aircraft, is provided comprising an actuation element, which can be brought from a blocking state into a release state and vice versa; a power supply interface, by means of which the access control device can be supplied with power; a control unit, which is designed to carry out open-loop and/or closed-loop control of the state of the actuation element; a near-field communication interface, which is designed to read out a digital access authorisation and to transmit the digital access authorisation to the control unit; wherein the control unit is designed to carry out open-loop and/or closed-loop control of the state of the actuation element in accordance with the validity of the digital access authorisation, wherein the power supply interface is designed for the connecting of a portable energy store without the use of tools.

First, some terms used in the present disclosure are defined.

For the purposes of this disclosure, connecting without the use of tools means that a user can connect the portable energy store with his bare hands. However, this does not mean that the power supply interface necessarily has to be exposed. It can be protected from external environmental influences, such as dust and/or moisture, for example by a protective device, as long as the protective device can be removed with the bare hand.

Within the meaning of the present disclosure, a valid digital access authorisation is understood to mean a digitally storable authorisation, for example in the form of a code or a data record, which authorises a user to actuate the actuation element of the access control device.

A power supply interface within the meaning of the present disclosure can be a contact-based interface in which the power supply is provided by means of electrically conductive contact points. The contact points are then part of the power supply interface. Furthermore, the power supply interface can also, however, be designed in such a way that the power supply can be contactless, for example by means of an induction loop. In this case, the induction loop is part of the power supply interface.

The easy accessibility of the power supply interface allows the user to conveniently connect a portable energy store to the power supply interface. This means that the access control device is only supplied with power when required; a so-called "power on demand" solution is created. The power supply via the disclosed power supply interface offers the advantage that the access control device does not have to be connected to a power grid. When the access control device is used in a vehicle, the power supply of the access control device can thus be segregated from the on-board power grid. This is particularly advantageous when used in an aircraft, because the connection of additional installations or attachments to the on-board power grid can not only be technically complex, but also has to be approved in accordance with aviation law. Furthermore, the disclosed power supply interface can eliminate the need for an internal battery or accumulator in the access control device, thus reducing maintenance effort.

The power supply interface is preferably designed to transmit sufficient electrical power so that the actuation element can be actuated solely by the power supply of the power supply interface. Preferably, the power supply interface is designed to transmit electrical power provided by the portable energy store in the form of 2 to 10 volts direct current, furthermore for example 4 to 6 volts direct current, in particular preferably 5 volts direct current.

The near-field communication interface is preferably an interface that works on the basis of radio frequency identification (RFID) technology. The digital access authorisation is stored, for example, on an authorisation unit, preferably in the form of an access authorisation card. If the authorisation unit is then held close to the near-field communication interface, for example at a distance of less than 10 cm, the access authorisation stored on the card can then be read out via the near-field communication interface and transmitted by it to the control unit.

Preferably, the actuation element comprises an actuator and a latch or another element that can be brought into different switching positions by the actuator. The latch or other element is, for example, mounted so that it can be moved, pivoted, and/or rotated, so that it can be moved between different switching positions. Depending on the switching position, the actuation element is then, for example, in the blocking state or in the release state.

Preferably, the control unit is designed to verify the validity of an access authorisation transmitted via the near-field communication interface, wherein the control unit is designed to generate a control signal if the digital access authorisation has been verified as valid by the control unit and the power supply interface is supplied with power by a portable energy store. The control signal generated in this way causes, for example, the actuation element to be brought into the release state. However, the control signal can also, for example, cause the actuation element to be brought into the blocking state. By means of the disclosed solution, it is therefore possible, for example, to lock and unlock a door or, for example, to allow or prevent the actuation of a door handle. By supplying power via the power supply interface as a condition for switching the actuation element to the release state or the blocking state, security can be increased compared to solutions that only work with a digital access authorisation. In order to actuate the actuation element, the user always needs not only the access authorisation but also a suitable portable energy store. This implements a two-factor authentication. Safety can be increased even further by designing the power supply interface in such a way that no commercially available energy stores can be connected to it.

According to a further preferred embodiment, in order to make the power supply interface accessible without the use of tools, it is disclosed herein that the access control device comprises a housing which forms an interior space, wherein at least the control unit is arranged in the interior space, wherein the power supply interface is arranged on the outer side of the housing facing away from the interior space. The housing can be formed, for example, by one housing part or a plurality of housing parts. Furthermore, it is also possible for the housing to interact with components of the door, a door frame and/or a door lock on which the access control device is installed; in this case, it is possible that the interior space is only formed by the installation of the housing with the other components. In addition to the control unit, further components of the access control device can be arranged in the interior space, but the decisive factor is that the power supply interface and preferably also the near-field communication interface is/are arranged on the outer side. This ensures easy accessibility of the interfaces for the user.

Preferably, the interior space formed by the housing is hermetically sealed from the surrounding environment, for example by a seal. In a multi-part housing, the seal can be arranged, for example, between two housing parts and/or between a housing part and an adjacent component, for example a door handle.

According to a further preferred embodiment, in order to make the power supply interface accessible without the use of tools, it is disclosed herein that both the power supply interface and the near-field communication interface are part of a common operating interface. By arranging both the near-field communication interface and the power supply interface on a common operating interface, operating convenience is further increased. The interfaces are preferably arranged locally directly adjacent to one another on or at the operating interface, so that the portable authorisation unit and the portable energy store can be connected to the respective interface even with one hand.

According to a further preferred embodiment, it is disclosed herein that the power supply interface comprises a holding element which is designed to hold the portable energy store on the power supply interface, for example under the action of a magnetic force, so that the power supply interface is supplied with power by a portable energy store. The holding device can initially be used to temporarily hold the portable energy store in a state connected to the power supply interface, so that the user only has to concern himself with positioning the portable authorisation unit near the near-field communication interface to actuate the actuation element with increased convenience. References in the following to positioning the portable authorisation unit near the near-field communication interface mean with a distance of less than 10 cm between the two components. So that the portable energy store can be held on the power supply interface by, for example, the action of a magnetic force, this interface can comprise a permanent magnet.

Preferably, the power supply interface has a recess, into which the portable energy store can be inserted. The recess allows the portable energy store to be reliably mounted and positioned while it is connected to the power supply interface. Preferably, the recess is designed to correspond in shape to an outer contour of the portable energy store. Furthermore, it has proven advantageous to combine the recess with the holding element.

Preferably, the power supply interface and/or the near-field communication interface are each identified for a user by at least one visual means. Such identification allows the user to assign the portable energy store and/or the portable authorisation unit directly to the correct interface. In principle, it would be sufficient to identify one of the interfaces with an appropriate visual means, because then the other interface can also be assigned according to the principle of exclusion. However, in practice it has proven advantageous for reasons of convenience to equip both the near-field communication interface and the power supply interface each with a visual means. Preferably, one or more of the visual means can also be designed to be self-luminous, which can be achieved, for example, by fluorescent components of a visual means. This ensures that the power supply interface and the near-field communication interface can be easily located even in dark ambient conditions.

According to a further preferred embodiment, it is provided that the power supply interface comprises an additional near-field communication interface which is designed to read out an additional digital access authorisation and to transmit the additional digital access authorisation to the control unit. A corresponding control signal that causes the actuation element to move into the release state or into the blocking state is generated only when the following three conditions are met. First, the power supply interface is supplied with power by the portable energy store. Second, the digital access authorisation read via the near-field communication interface is valid. Third, the additional digital access authorisation read via the additional near-field communication interface is also valid. By connecting the portable energy store to the power supply interface, the additional digital access authorisation, which is retrievably saved in a memory of the portable energy store for the additional near-field communication interface, can also be read out at the same time. This achieves three-factor authentication as a precondition for the actuation of the actuation element.

Preferably, the actuation element can be switched bistable or monostable. If the actuation element can be switched monostable, then the stable state is the blocking state. If the actuation element can be switched bistable, then the release state and the blocking state each form a stable state. In the case of the actuation element that can be switched bistable, the actuation element can additionally be brought from the release state into the blocking state if the same conditions exist as when generating the control signal that causes switching to the release state.

According to a further preferred embodiment, it is provided that the actuation element can be switched monostable, wherein a capacitor is provided for temporarily supplying the actuation element with electrical power, so that the actuation element can remain in the unstable state for a predefined period of time when the power supply interface is not supplied with power. The actuation element preferably comprises an actuator, for example in the form of a switching magnet, which, when subjected to a corresponding electrical voltage, moves a latch against the force of a spring. When the latch has been moved against the force of the spring, the actuation element is in the release state. If the latch is moved back by the spring force when the corresponding electrical voltage is removed, the actuation element is in the blocking state. Preferably, the capacitor has a capacitance that allows it to store a sufficient amount of power to switch the actuation element to the release state for a period of 2 to 20 seconds, more preferably for 5 to 15 seconds, and in particular preferably for 10 seconds. If a user has switched the actuation element to the release state using the portable energy store and the portable authorisation unit, he will generally not open the door immediately, but will first remove the portable energy store and the portable authorisation unit from the interfaces. In the absence of the power supply via the power supply interface, the actuation element would immediately return to the blocking state due to its monostable property. The capacitor can prevent this switching back for a sufficiently long period of time to allow a user to open the door. In principle, however, it would also be possible to realise the function of the capacitor using a battery or an accumulator.

Preferably, the access control device comprises a data interface for updating the valid access authorisations. For example, if a portable authorisation unit is lost, the digital access authorisation stored on it can be deleted or deactivated on the control unit of the access control device and a new access authorisation can be activated or added instead. The data interface can be, for example, a wired interface according to the USB standard, or alternatively a wireless data interface, for example according to a Bluetooth standard.

Preferably, the access control device comprises a visual and/or acoustic indicating device which indicates to the user whether the portable energy store is correctly connected to the power supply interface and/or whether the access authorisation read out by the near-field communication interface is valid or invalid and/or whether the authorisation unit can be removed again from the near-field communication interface. The visual indicating device can be formed by at least one LED, and the acoustic indicating device can be formed by at least one loudspeaker.

Preferably, the access control device comprises an override unit with which the actuation element can be mechanically overridden independently of the control signal of the control unit.

According to a second aspect of the present application, the object mentioned at the outset is achieved by an access control system for doors of a vehicle, in particular an aircraft, wherein the access control system comprises: an access control device as described above; a portable authorisation unit, on which a digital access authorisation for the near-field communication interface of the access control device is retrievably stored; and a portable energy store, which is designed to supply the access control device with power by means of the power supply interface.

Preferably, the portable authorisation unit is a transponder. Further preferably, it is a passive transponder. In practice, it has proven useful if the authorisation unit is the size of a check card.

Preferably, the portable energy store comprises a battery or a rechargeable accumulator with a direct current voltage of between 2 and 20 volts, further, for example, between 4 and 6 volts, particularly preferably 5 volts. The capacity of the battery or accumulator is at least 1000 mAh, but preferably several thousand mAh.

With regard to the technical effects and advantages associated with the access control system, reference is made to the previous explanations in connection with the access control device.

According to a third aspect of the present application, in order to achieve a door portion, in particular of a vehicle, it is provided to include a door; a door frame; and a door lock, which is designed to lock the door in a closed position in the door frame, wherein an access control device as described above is provided, wherein the actuation element interacts with the door lock in such a way that the locking of the door is released or can be released when the actuation element is in the release state. Accordingly, the closed door cannot be opened if the actuation element is in the blocking state. In this way, the door can be locked and unlocked securely.

For example, a power supply interface and a near-field communication interface can each be provided on both an inner and an outer side of the door portion. In this way, the access control device can be operated from the inside and the outside. In this case, the actuation element can preferably be switched bistable, so that convenient locking from the inside is also possible. If, for example, a user wants to lock himself in the interior of a VIP aircraft for security reasons, he can close the door and bring the actuation element into the blocking state by connecting the portable energy store and the portable authorisation unit to the corresponding interfaces; the door is then locked. Due to its bistable property, the actuation element then remains in the blocking state even after the portable energy store (and the portable authorisation unit) have been removed. If the user then wants to leave the aircraft, he can bring the actuation element into the release state by reconnecting the portable energy store and the portable authorisation unit to the corresponding interfaces; the door can then be opened again.

According to a preferred embodiment, it is provided that the door lock comprises a door handle, with which the door is locked or released in the door frame depending on the position of the handle, wherein the actuation element is designed to prevent the door handle from being actuated in the blocking state, and wherein the actuation element is designed to allow the door handle to be actuated in the release state. This type of interaction between the actuation element and the door lock means that the access control device can be easily retrofitted.

According to a further preferred embodiment, it is provided that the door handle comprises a flap that can be pivoted about a pivot shaft, wherein the door handle can be brought into a position that unlocks the door only if the flap is pivotable, wherein the actuation element allows pivotability of the flap in the release state; and wherein the actuation element prevents pivotability of the flap in the blocking state. For example, by operating the flap, a gripping edge can be released for a user, which the user should grasp in order to actuate the door handle. Such door handles with flaps are known from aircraft construction. They are used, for example, in aircraft doors manufactured by Airbus. The interaction of the actuation element with the flap allows the door handle to be blocked indirectly. In this way, an efficient retrofit solution can be provided for aircraft manufactured by Airbus. In principle, such door handles can be found on passenger entrance doors, service doors and cargo hold doors of Airbus aircraft; accordingly, these doors can also be retrofitted with the proposed solution.

According to a fourth aspect of the present disclosure, to achieve a method for opening a closed and locked door of a door portion described above is provided, which method comprises the following method steps:

a) energy-transmitting connection of the portable energy store to the power supply interface; and subsequent b) signal-transmitting connection of the portable authorisation unit to the near-field communication interface; and subsequent c) opening of the door.

With regard to the technical effects and advantages associated with the method, reference is made to the previous explanations in connection with the access control device and the door portion.

The present disclosure is explained below on the basis of preferred embodiments, with reference to the accompanying figures.

FIG. 1 shows an access control system 100 comprising an access control device 1 as well as a portable energy store 10 and a portable authorisation unit 20.

The access control device 1 comprises a first and a second housing part 29 and 30 (see also FIG. 4), which together form a housing 11. On an outer side 12 of the housing 11, both a power supply interface 7 and a near-field communication interface 9 are provided. The housing 11 has on the outer side 12 a substantially flat operating interface 13, which comprises both the power supply interface 7 and the near-field communication interface 9. The two interfaces 7 and 9 are thus arranged next to each other without being separated from each other by edges or other elements of the housing 11. This allows a user easy access to both the interfaces 7 and 9.

The power supply interface 7 comprises a cylindrical recess 15, which is designed to correspond in shape to an outer contour of the portable energy store 10. In this way, the portable energy store 10 can be held in position in the inserted state, i.e. when it is connected to the power supply interface 7, by a wall surface 33 formed by the recess 15. The power supply interface 7 comprises two electrically conductive contacts 31 arranged coaxially to one another, which are designed to be connected to corresponding electrically conductive contacts 32 of the portable energy store 10. Furthermore, the power supply interface 7 comprises a holding element 14 in the form of a permanent magnet. The holding element 14 is arranged in the wall surface 33 of the recess 15. Furthermore, the portable energy store 10 also comprises a holding element 34 in the form of a permanent magnet, so that the two holding elements, i.e., wall surface 33 and permanent magnet 34, interact in such a way that the portable energy store 10 can be fixed to the power supply interface 7 under the action of a magnetic force. In this state, the access control device 1 can be supplied with electrical power by means of the electrical contacts 31 and 32 contacting one another.

The portable energy store 10 comprises a battery or a rechargeable accumulator with a direct current voltage of 10 V and a capacity of several thousand milliampere hours.

Figures 5, 6:
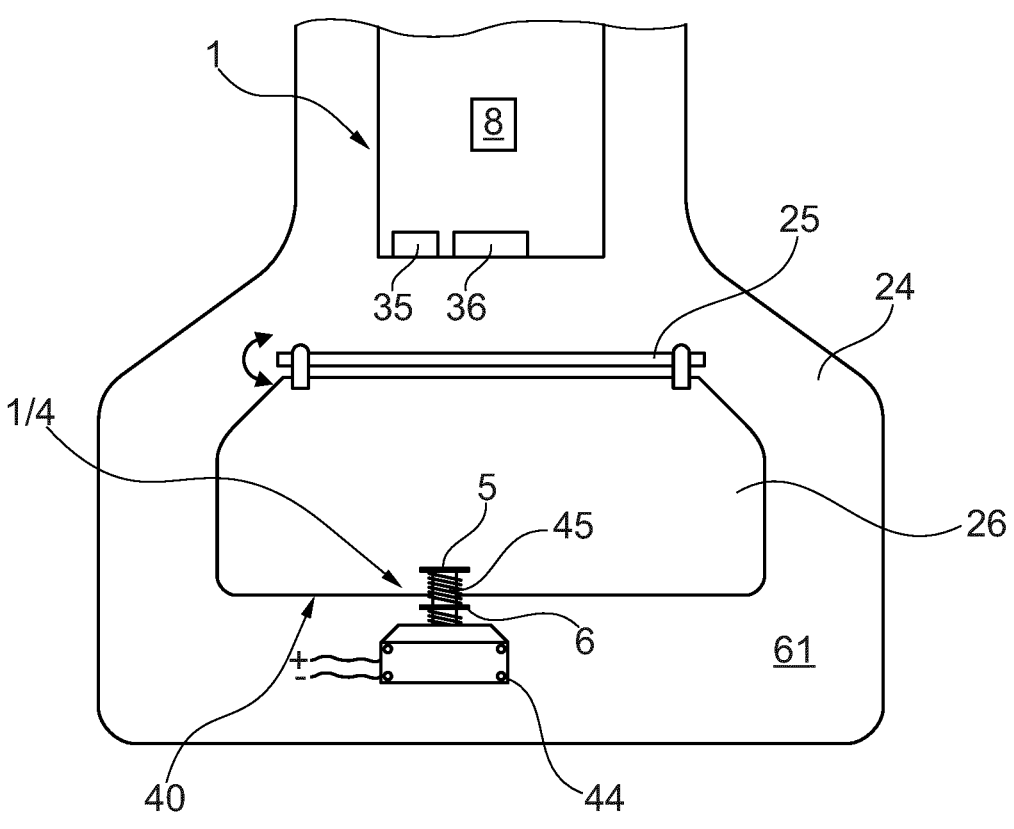
FIG. 5 shows a detail view of a door handle with an access control device.
FIG. 6 shows a schematic representation of the wiring of the access control device.

The near-field communication interface 7 is designed to read a digital access authorisation from the portable authorisation unit 20 and to transmit it to a control unit (controller) 8 (see FIGS. 5 and 6). The near-field communication interface 9 works on the basis of radio frequency identification (RFID) technology. The portable authorisation unit 20 therefore comprises a passive transponder on which the digital access authorisation is retrievably saved. As shown, the external dimensions of the portable authorisation unit 20 are the size of a check card. As soon as the portable authorisation unit 20 is brought close to the near-field communication interface 9, i.e. less than 10 cm away from it, the digital access authorisation can be read out by the near-field communication interface 9 and transmitted to the control unit 8 (see FIGS. 5 and 6).

To enable a user to see where the near-field communication interface 9 and the power supply interface 7 are arranged, the operating interface 13 comprises various visual means 16, 17, and 18. The visual means 16 marks the power supply interface 7 and can be identified, for example, with the designation "PWR," which is the abbreviation for "power." The further visual means 17 comprises a symbol that marks a wireless interface. The visual means 18 indicates a frame intended to allow the user to correctly position the portable authorisation unit 20 relative to the near-field communication interface 9. In this case, the visual means 18 is formed by a fluorescent printing, so that it can be perceived by a user even in poor lighting conditions. In principle, it is also possible for the other visual means 16 and 17 to also be formed by fluorescent printing.

The operating principle of the access control system 100 is as follows: to supply the access control device 1 with electrical power, the portable energy store 10 is positioned in the recess 15 of the power supply interface 7. The portable authorisation unit 20 is then held at the near-field communication interface 9. If the digital access authorisation stored thereon is valid, the actuation element 4 (see FIG. 5 and FIG. 8) is actuated in such a way that a door 21 (see FIG. 9) can be locked or unlocked.

In order to further increase security, the power supply interface 7 can comprise an additional near-field communication interface 19, which is designed to read an additional digital access authorisation from an additional access authorisation unit 39, which is part of the portable energy store 10. By connecting the portable energy store 10 to the power supply interface 7, the additional digital access authorisation from the additional authorisation unit 39, which can be formed, for example, by an NFC tag, can be read out automatically by means of the additional near-field communication interface 19, without the portable energy store 10 having to be brought into an extra position provided for this purpose. However, the additional near-field communication interface 19 does not necessarily have to be provided.

In order to provide the user with feedback as to whether the digital access authorisations stored on the portable authorisation unit 20 and the additional authorisation unit 39 are valid, a first indicating device 37 and a second indicating device 38 are provided. If, for example, a portable authorisation unit 20 with an invalid access authorisation is held up to the near-field communication interface 9, the first indicating device 37 lights up, which can, for example, include the text field "FAULT." However, if a portable authorisation unit 20 with a valid access authorisation is held up to the near-field communication interface 9 and the additional access authorisation is also valid, the second indicating device 38 lights up, which can, for example, include the text field "REMOVE"; the user thereby recognises that his access authorisation has been successfully checked and found to be valid, and that he can remove the authorisation unit 20 and the portable energy store 10 from the interfaces 7 and 9, and finally can open the door 21 (see FIG. 9). The indicating devices 37 and 38 are illuminated by LEDs.

The open-loop or closed-loop control of the actuation element 4 by the control unit 8 on the basis of the valid access authorisations is explained in detail below. An electrical interface 35 is provided on the housing for controlling and supplying power to the actuation element 4. Furthermore, a data interface 36 is provided on the housing 11 in the form of a USB interface so that the control unit 8 can be updated as necessary. For example, invalid access authorisations can be deleted or deactivated and valid access authorisations can be saved or activated.

The portable energy store 10 and the portable authorisation unit 20 are connected to each other by means of a cord 27 and a ring 28 so that they can be easily transported by a user. It goes without saying that the design of the authorisation unit 20 and/or the energy store 10 can be adapted according to the user's wishes; this relates to both the graphic design and the choice of materials.

The use of the access control device 1 on a door handle 24 of a door 21 of a passenger entrance of an aircraft manufactured by Airbus is described below with reference to FIGS. 2 to 6.

Figure 2:
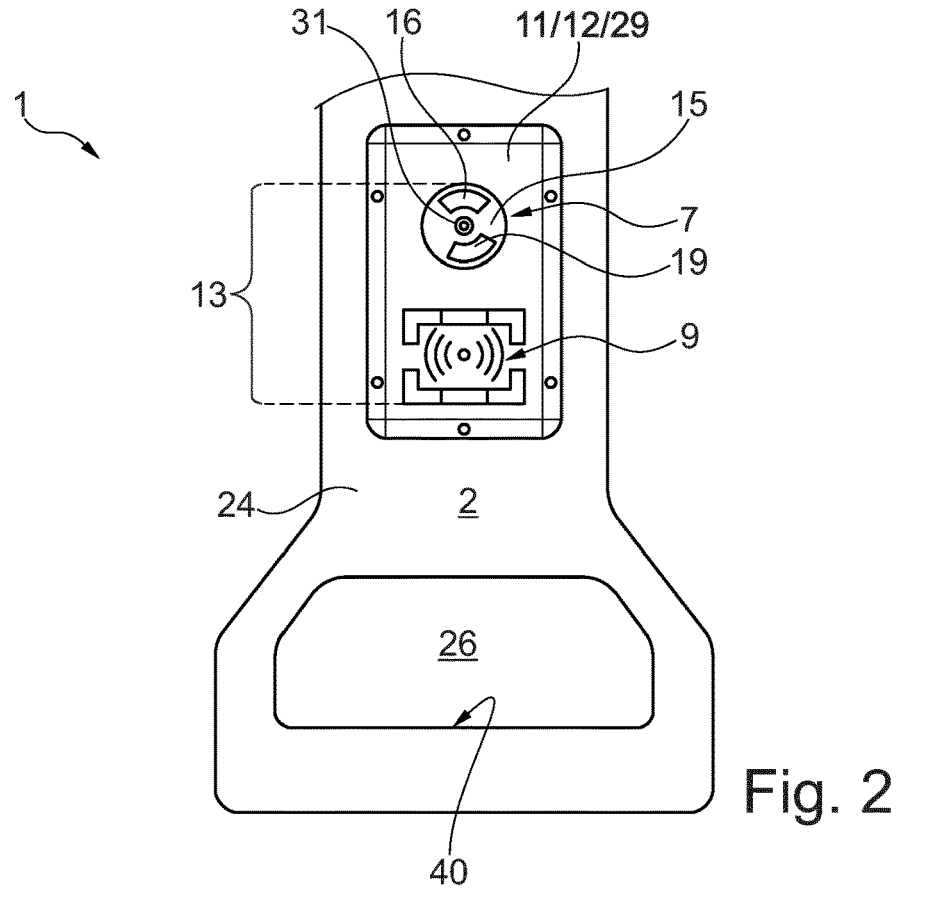
FIG. 2 shows an access control device on a door handle.

FIG. 2 shows the door handle 24 with the access control device 1 fixedly mounted on it. The door handle 24 comprises a gripping edge 40, which can be made accessible by a pivotably mounted flap 26. The flap 26 releases the gripping edge 40 when the following three conditions are met: First, the power supply interface 7 should be supplied with power by the portable energy store 10. Second, the access authorisation read via the near-field communication interface 9 must be valid. Third, the additional access authorisation read out by the additional near-field communication interface 19 must also be valid.

Figure 3:
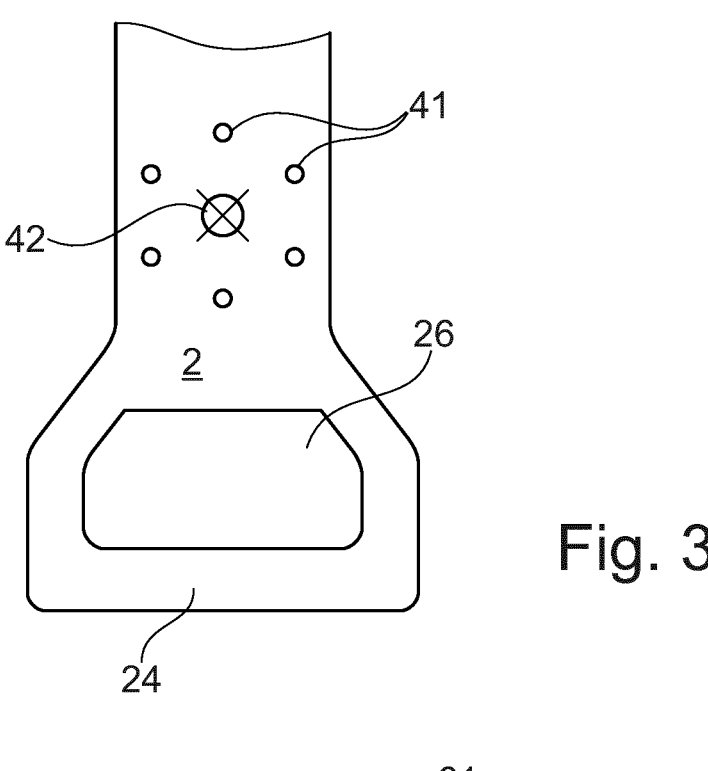
FIG. 3 shows a door handle.

FIG. 3 shows the door handle 24 without the access control device 1 mounted on it. For this purpose, six fastening holes 41 are provided in the door handle 24, of which only two are provided with reference signs. The access control device 1 can be mounted on the door handle 24 by means of its housing 11 at the fastening holes 41 using fastening means, for example in the form of bolts or screws. Furthermore, FIG. 3 shows a line hole 42 through which the lines of the access control device 1 can be routed, which lines connect the near-field communication interface 9 and the power supply interface 7 to the control unit 8. Accordingly, the power supply interface 7 and the near-field communication interface 9 are arranged on one side of the line hole 42, whereas the control unit 8 is arranged on the other side of the line hole 42. The fastening holes 41 and the line holes 42 have no influence on the pressurised cabin of the aircraft, which significantly reduces the retrofitting effort.

Figure 4:
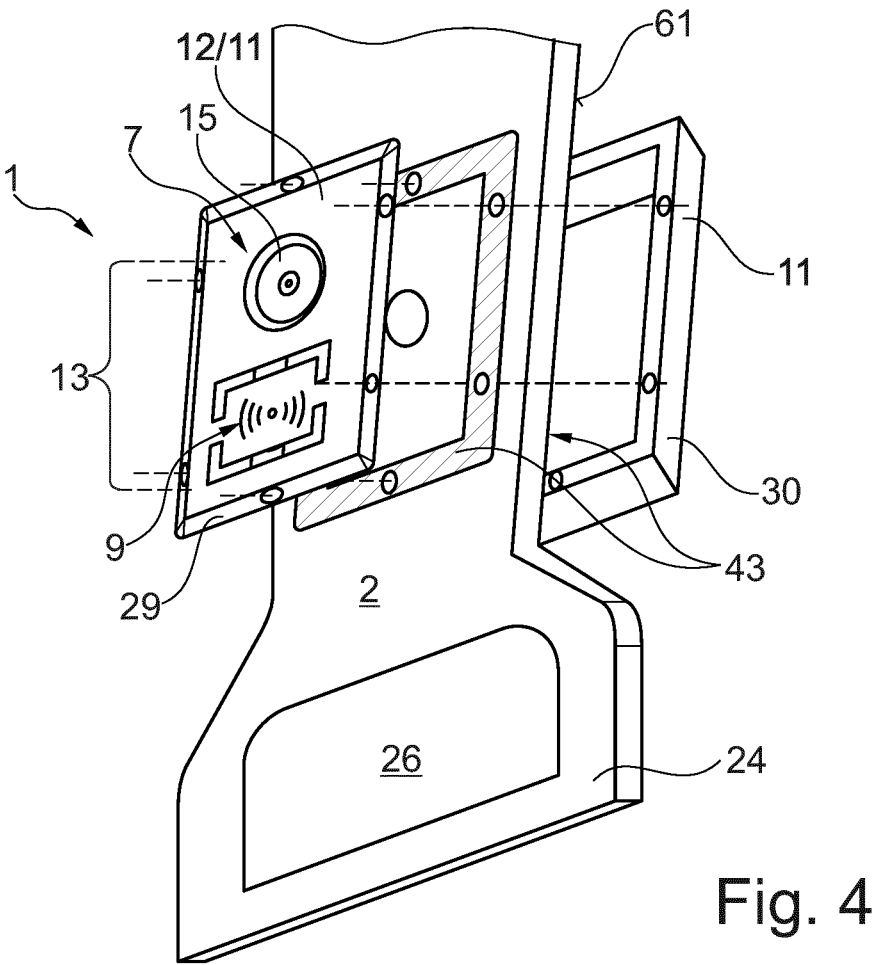
FIG. 4 shows an exploded view of an access control device on a door handle.

FIG. 4 shows the fastening of the access control device 1 to the door handle 24 in an exploded view. Furthermore, the two-part housing 11 can be seen, which comprises the first housing part 29 and the second housing part 30. The first housing part 29 is arranged on a front side 2 of the door handle 24 and the second housing part 30 on the rear side 61 of the door handle 24. In order to seal the interior space, formed by the two housing parts 29 and 30 together with the door handle 24, from the environment, a seal 43 in the form of a circumferential rubber seal is provided between the first housing part 29 and the door handle 24 and between the second housing part 30 and the door handle 24. This allows the components of the access control device 1 arranged in the interior space of the housing 11 to be protected from negative environmental influences, such as moisture and/or dust.

FIG. 5 shows the rear side 61 of the door handle 24. It can be seen that the flap 26 is pivotably mounted on the remaining part of the door handle 24 via a pivot shaft 25. Furthermore, the actuation element 4 can be seen as part of the access control device 1. Said element comprises an actuator 44 in the form of a switching magnet and a latch 45 adjustable by the actuator 44. Depending on the adjustment position of the latch 45, the actuation element 4 is in a blocking state 5 or in a release state 6. It can be seen that, in the blocking state 5, the latch 45 blocks the pivotability of the flap 26 and, in the release state 6, a pivoting movement of the flap 26 is made possible, so that in the release state 6 a user can grasp the gripping edge 40 with his fingers by pivoting the flap 26 and can actuate the door handle 24 by a pulling movement. When the actuation element 4 is in the blocking state 5, the flap 26 is blocked, whereby the gripping edge 40 is not accessible to the user and thus cannot be grasped; consequently, the door handle 24 cannot be actuated in this state.

In this embodiment, the actuation element 4 is monostable, so that it returns to the blocking state 5 without power supply. In principle, however, embodiments with actuation elements 4 that can be switched bistable are also conceivable. In order to give a user sufficient time to actuate the door handle 24 even after removing the portable energy store 10 (see FIG. 1), a capacitor 55 (see FIG. 6) is provided as an energy store. The capacitor is designed such that the actuation element 4 remains in the release state 6 for approximately 10 seconds after the portable energy store 10 has been removed; the actuation element 4 is then switched back to the blocking state 5, for example by the action of a spring force.

The actuation element 4 is attached to the door handle 24 by means of an adhesive connection not visible here. The control or supply of power to the actuation element 4 is carried out via a line, which is connected to the electrical interface 35.

FIG. 6 shows schematically the wiring or cabling of the individual components of the access control device 1. On the left side, the second housing part 30 assigned to the control unit 8 is shown together with the other components arranged therein. On the right side of FIG. 6, the components of the access control device 1 assigned to the first housing part 29 are shown. The components shown on the left side of FIG. 6 are arranged on the rear side 61 of the door handle 24 in FIG. 4, whereas the components shown on the right in FIG. 6 are arranged on the front side 2 of the door handle 24 in FIG. 4.

The control unit 8 is connected in terms of signals, or electrically, to a transceiver 46 for near-field communication according to the RFID standard. By means of an electrical or signal-transmitting connection 48, the transceiver 46 is connected to a sensor field 47 for near-field communication according to the RFID standard. The sensor field 47 is part of the near-field communication interface 9.

Furthermore, the control unit 8 is connected in terms of signals, or electrically, to an LED driver 49. The LED driver 49 is connected to the first and second indicating devices 37 and 38 by means of an electrical or signal-transmitting connection 50.

Furthermore, the control unit 8 is connected in terms of signals, or electrically, to a USB controller 51. The USB controller 51 is connected to the data interface 36 by a signal-transmitting, or electrical, connection 52.

Furthermore, the control unit 8 is connected to a power module 53 in terms of signals or electrically. By means of the signal-transmitting or electrical connection 54, the power module 53 is connected to the electrical contacts 31 of the power supply interface 7.

Furthermore, the control unit 8 is electrically connected to the capacitor 55, which in turn is connected via the electrical connection 56 to the electrical interface 35, via which the actuation element 4 can be supplied with electrical power.

The additional near-field communication interface 19 is connected to the transceiver 46 via a connection, just as is the near-field communication interface 9.

The control unit 8 comprises a data memory and a processor, so that the control unit 8 can basically be used both for open-loop and closed-loop control of the actuation element 4.

In this embodiment, the control unit 8, the transceiver 46, the LED driver 49, the USB controller 51, the power module 53 and the capacitor 55 are arranged on a common circuit board 57.

Furthermore, FIG. 6 shows a battery 58 arranged inside the housing 11, which, however, is not designed to supply the actuation element 4 with power. For security reasons, the access control device 1 is designed to supply the actuation element 4 with power exclusively via the power supply interface 7 arranged on the outer side 12 of the housing 11. The battery 58 can be used, for example, to supply the indicating devices 37 and 38 with electrical power.

Differing from the embodiments of FIGS. 2 to 6, FIG. 7 shows a door handle 24 of a cargo door of an aircraft manufactured by Airbus. This door handle 24 has a different geometry compared to the embodiments shown in FIGS. 2 to 5, wherein a flap 26 is also provided here. The operating principle is therefore identical.

Figure 7:
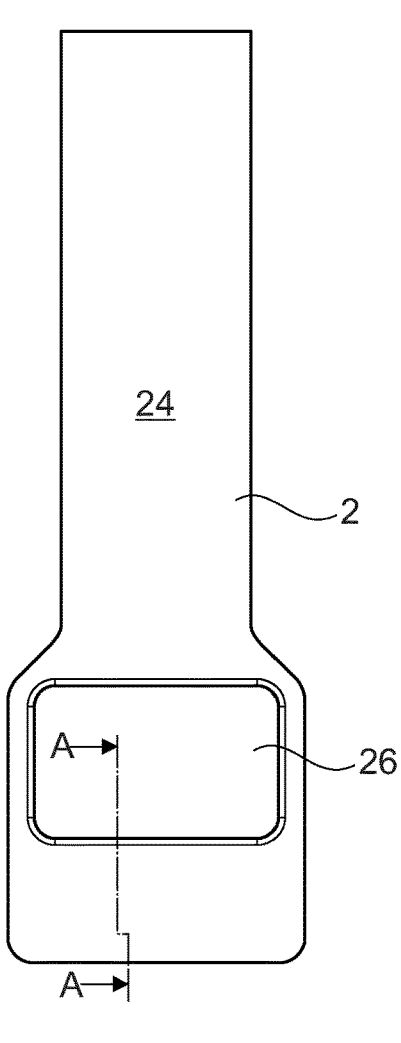
FIG. 7 shows a door handle of a cargo door of an aircraft.
Figure 8:
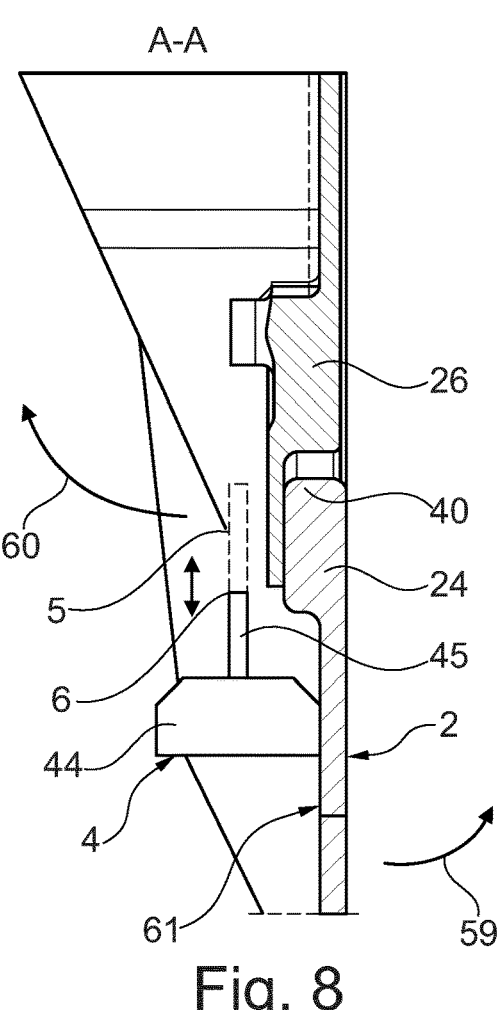
FIG. 8 shows a sectional view of a door handle and an actuation element.

FIG. 8 shows a sectional view along the section line A-A from FIG. 7, wherein the actuation element 4 is shown only schematically. In order to bring the door handle 24 into an opening position, it should be pivoted in the direction of the arrow 59. In order for a user to exert the corresponding pulling force on the door handle 24, the user should be able to grasp the gripping edge 40. However, this is only enabled if the flap 26 can be pivoted in the direction of the arrow 60. If the actuation element 4 is in the release state 6, this is then possible, because the flap 26 can be moved unhindered past the latch 45. However, if the actuation element 4 is in the blocking state 5 shown in dashed lines, the opening movement of the flap 26 is blocked by the latch 45. The user then cannot grasp the gripping edge 40 and thus cannot move the door handle 24 in the direction of the arrow 59.

Figure 9:
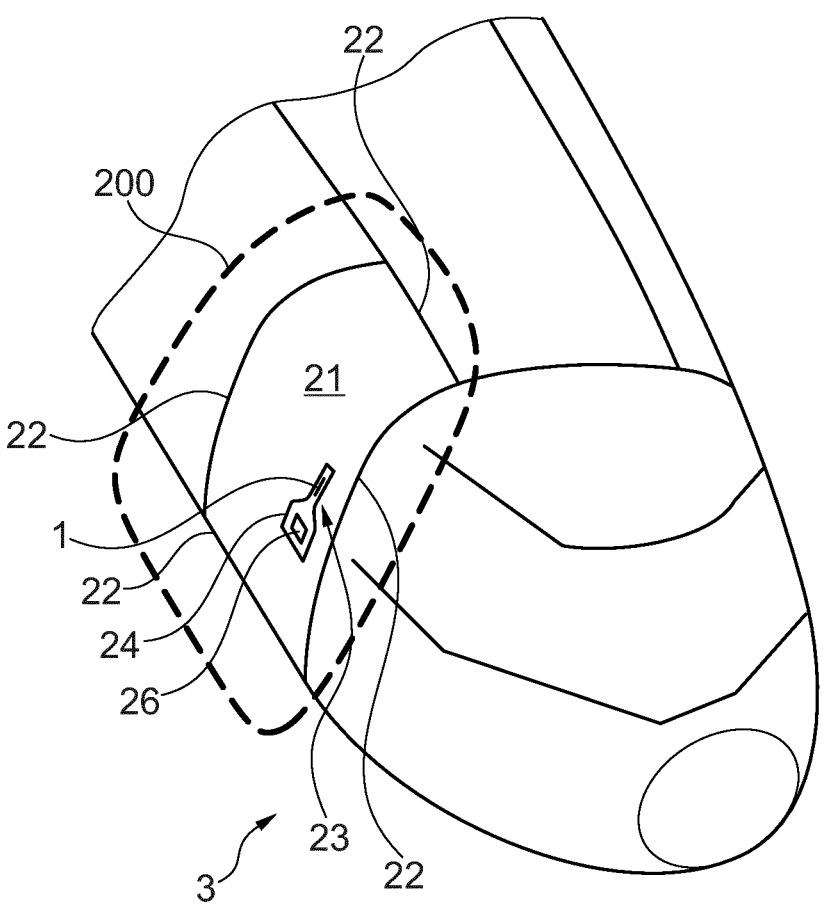
FIG. 9 shows an aircraft with a door portion.

FIG. 9 shows an aircraft 3 in the form of an airplane with a door portion 200 comprising a door 21, a door frame 22, and a door lock 23. With the door lock 23, the door 21 can be locked in a closed position in the door frame 22. Furthermore, for actuation, the door lock 23 comprises door handle 24, on which an access control device 1 is mounted. The door portion 200 shown is a door portion 200 with a passenger door, so that with regard to the structure and functioning of the access control device 1, reference is made to the embodiments shown in FIGS. 1 to 6.

Figure 10:
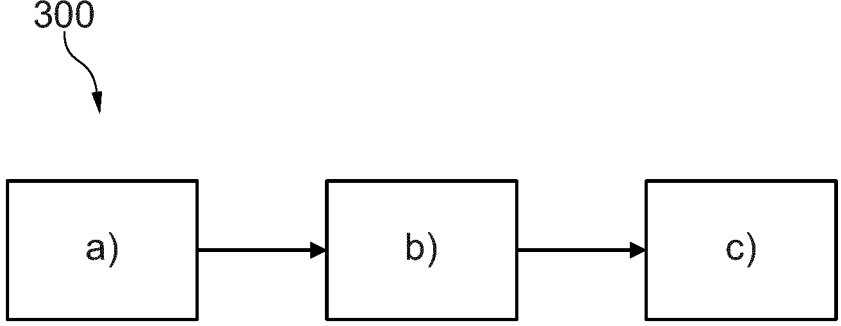
FIG. 10 shows a schematic representation of a method for opening a locked aircraft door.

FIG. 10 schematically shows a method 300 for opening a door 21 of the door portion 200 shown in FIG. 9, which door is locked in the closed state.

In a method step a), the portable energy store 10 is connected to the power supply interface 7 so as to transmit power (see, for example, FIG. 1). The access control device 1 is then supplied with power via the power supply interface 7. In this method step, the additional access authorisation saved on the additional authorisation unit 39 of the portable energy store 10 is then read out by means of the additional near-field communication interface 19 of the power supply interface 7 without action by the user. The validity of the additional access authorisation is then checked by the control unit 8 (see, for example, FIG. 6).

Subsequently, in a method step b) the portable authorisation unit 20 is connected to the near-field communication interface 9 in signal-transmitting fashion. The access authorisation stored on the portable authorisation unit 20 is thus read out by means of the near-field communication interface 9 (see FIG. 1) and is transmitted to the control unit 8 (see FIG. 8).

If both digital access authorisations have been verified as valid by the control unit 8 and the power supply interface 7 is still being supplied with power by the portable energy store 10, then the actuation element 4 shown in FIG. 5 is switched from the blocking state 5 to the release state 6, so that the door handle 24 shown in FIG. 9 can be actuated by releasing the flap 26.

By actuating the door handle 24, the door 21 can then be unlocked and thus also opened in a method step c).

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An access control device for a door of a vehicle, the access control device comprising:

an actuation element comprising an actuator, the actuation element being controllably configured to be brought from a blocking state into a release state and vice-versa;

a power supply interface, which is configured to supply the access control device with power;

a controller, which is configured to carry out open-loop and/or closed-loop control of a state of the actuation element; and a near-field communication interface, which is configured to read out a digital access authorisation and to transmit the digital access authorisation to the controller; wherein:

the controller is configured to carry out the open-loop and/or closed-loop control of the state of the actuation element in accordance with a validity of the digital access authorisation, the power supply interface is configured such that a portable energy store is connectable without the use of tools, the power supply interface comprises an additional near-field communication interface, which is configured to read out an additional digital access authorisation and to transmit the additional digital access authorisation to the controller, and the controller is configured to generate a control signal that causes the actuation element to move into the release state or into the blocking state based on a determination that each of the following conditions are met:

the power supply interface is supplied with power by the portable energy store, the digital access authorisation read via the near-field communication interface is valid, and the additional digital access authorisation read via the additional near-field communication interface is valid.

2. The access control device according to claim 1, wherein:

the access control device further comprises a housing, which forms an interior space, the controller is arranged in the interior space, and the power supply interface is arranged on an outer side of the housing facing away from the interior space.

3. The access control device according to claim 1, wherein:

both the power supply interface and the near-field communication interface are part of a common operating interface.

4. The access control device according to claim 1, wherein:

the power supply interface comprises a holding element, which is configured to hold a portable energy store on the power supply interface so that the power supply interface is supplied with power by the portable energy store.

5. The access control device according to claim 1, wherein:

the power supply interface has a recess configured to receive the portable energy store.

6. The access control device according to claim 5, wherein additional near-field communication interface is arranged within the recess.

7. The access control device according to claim 6, wherein the power supply interface includes two electrically conductive contacts arranged coaxially to one another and arranged in the recess.

8. The access control device according to claim 7, wherein the power supply interface and the portable energy store each include a permanent magnet, the permanent magnet of the power supply interface being arranged within the recess and configured to receive the permanent magnet of the portable energy store so as to cause the portable energy store to be received within the recess by action of a magnetic force.

9. The access control device according to claim 1, wherein:

the power supply interface or the near-field communication interface are each visually identified for a user.

10. The access control device according to claim 1, wherein:

the actuation element is configured such that it can be switched bistable or monostable.

11. The access control device according to claim 10, wherein:

the actuation element is configured such that it can be switched monostable, and the access control device further comprises a capacitor configured to temporarily supply the actuation element with electrical power, so that the actuation element is configured to remain in an unstable state for a predefined period of time in a condition where the power supply interface is not supplied with power.

12. An access control system for doors of an aircraft, the access control system comprising:

the access control device according to claim 1;

a portable authorisation unit, on which a digital access authorisation for the near-field communication interface of the access control device is retrievably stored; and a portable energy store, which is configured to supply the access control device with power via the power supply interface.

13. A door portion of a vehicle, the door portion comprising:

a door;

a door frame;

a door lock, which is configured to lock the door in a closed position in the door frame; and the access control device according to claim 1, wherein:

the actuation element is configured to interact with the door lock in such a way that the locking of the door is released or is releasable in a condition where the actuation element is in the release state.

14. The door portion according to claim 13, wherein:

the door lock comprises a door handle, with which the door is configured to be locked or released in the door frame depending on a position of the handle the actuation element is configured to prevent the door handle from being actuated in the blocking state, and the actuation element is configured to allow the door handle to be actuated in the release state.

15. The door portion according to claim 13, wherein:

the door handle comprises a flap pivotable about a pivot shaft, the door handle is configured such that it can only be brought into a position that unlocks the door in a condition where the flap is pivotable, the actuation element in the release state allows the flap to be pivoted; and the actuation element in the blocking state prevents the flap from being pivoted.

16. A method for opening a closed and locked door of the door portion according to claim 13, the method comprising:

a) energy-transmitting connection of the portable energy store to the power supply interface; subsequently:

b) signal-transmitting connection of a portable authorisation unit to the near-field communication interface; and subsequently:

c) opening the door.

17. The access control device according to claim 1, wherein the portable energy store includes an access authorisation unit, and wherein the additional near-field communication interface is configured to read out the additional digital access authorisation from the access authorisation unit.

* * * * *